Dec. 5, 1967  A. WINKLER ET AL  3,356,311
RECEPTACLE FOR ROLL FILM
Filed Feb. 21, 1966  3 Sheets-Sheet 1

INVENTORS
ALFRED WINKLER
KARL BAMMESBERGER
BY
Michael S. Striker

Dec. 5, 1967  A. WINKLER ET AL  3,356,311
RECEPTACLE FOR ROLL FILM

Filed Feb. 21, 1966  3 Sheets-Sheet 2

INVENTOR.
ALFRED WINKLER
KARL BAMMESBERGER
BY
Michael J. Striker
atty

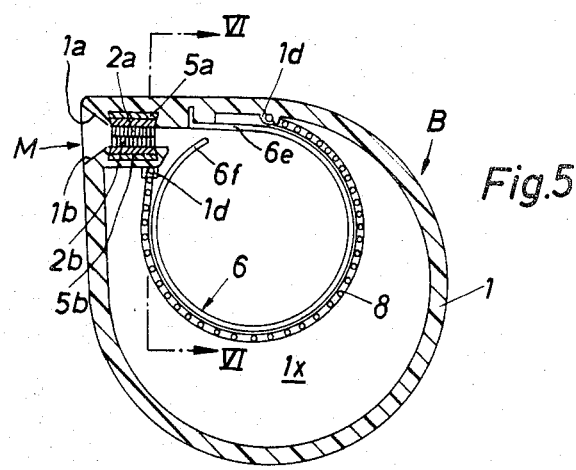
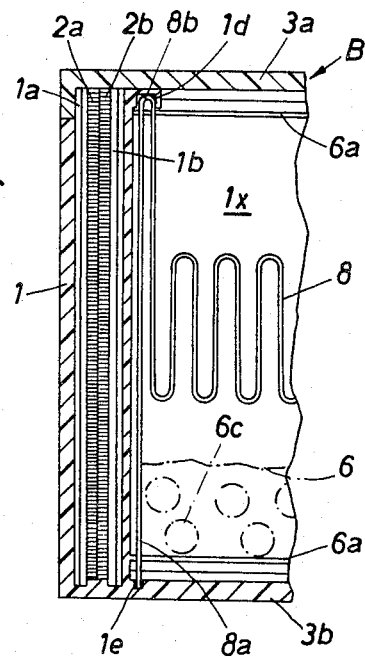
INVENTOR.
ALFRED WINKLER
KARL BAMMESBERGER
BY
Michael S. Striker
Atty

United States Patent Office 3,356,311
Patented Dec. 5, 1967

3,356,311
RECEPTACLE FOR ROLL FILM
Alfred Winkler, Munich, and Karl Bammesberger, Munich-Untermenzing, Germany, assignors to Agfa-Gevaert Aktiengesellschaft, Leverkusen, Germany
Filed Feb. 21, 1966, Ser. No. 529,137
Claims priority, application Germany, Mar. 3, 1965, A 48,538
11 Claims. (Cl. 242—71.1)

ABSTRACT OF THE DISCLOSURE

The housing of a film cartridge accommodates one or more looped helical or meandering springs whose ends are anchored at the opposite sides of the mouth. When the film is introduced through the mouth, the springs compel it to form a series of convolutions and oppose the unwinding of the thus convoluted film. Each spring follows closely the outline of the major part of the outermost convolution.

The present invention relates to receptacles for roll film in general, and more particularly to improvements in receptacles wherein the film may be convoluted without being connected with a rotary spool. Still more particularly, the invention relates to receptacles, particularly to cartridges for use in still cameras, wherein the film is coiled by means of one or more elastic bodies which are accommodated in the housing of the receptacle.

It is already known to roll the film in a spool-free cartridge by means of one or more leaf springs which are received in the housing of the cartridge and bear against the outermost convolution of film which is being fed through the mouth and into the interior of the housing. A serious drawback of such cartridges is that their springs are often too strong and that their bias is not predictable with requisite accuracy. Thus, while a leaf spring can guarantee the formation of a truly cylindrical film roll with tightly packed convolutions when the diameter of convoluted film exceeds a predetermined value, the bias of such spring might be insufficient when the diameter of the roll film is reduced below or did not as yet reach the predetermined value. On prolonged storage, the rolled portion of the film develops permanent waves or other unevennesses which prevent the film from lying flat against the film gate in response to withdrawal from the cartridge in order to make an exposure or a series of exposures. Also, and if the bias of a leaf spring is too strong, it again causes the convoluted film to assume other than a truly cylindrical shape. It can happen that the spring actually scratches the light-sensitive emulsion which coats one side of the film. The bias of leaf springs often fluctuates in response to changes in climate and, particularly if produced in a mass-manufacturing operation, the characteristics of leaf springs are often widely different so that one such spring may subject a roll of convoluted film to requisite bias whereas a whole series of other spring might be too weak or too strong.

Accordingly, it is an important object of the present invention to provide an improved receptacle for roll film and to incorporate in the receptacle one or more springs which are capable of subjecting convoluted film to optimum bias and whose bias varies little in response to changes in climate.

Another object of the invention is to provide a receptacle of the just outlined characteristics wherein the spring or springs may be anchored or otherwise retained in a very simple and time-saving manner.

A further object of the invention is to provide a receptacle wherein each section of each spring subjects the roll film to identical compressive stresses so that the spring or springs can guarantee a truly cylindrical shape of roll film and can also guarantee that the convolutions of such roll film remain tightly packed regardless of the diameter of theat length which is accommodated in the housing of the receptacle.

An additional object of the instant invention is to provide a receptacle for roll film wherein the spring or springs are configurated and mounted in such a way that the convoluted film retains the shape of a true cylinder regardless of the length of time during which the film remains in the receptacle and regardless of the diameter of convoluted film.

A concomitant object of the invention is to provide a receptacle of the above outlined characteristics wherein the spring or springs are mounted in such a way that they cannot scratch or otherwise damage the film.

A further object of the invention is to provide a novel spring which may be used in a receptacle of the above outlined type.

Briefly stated, one feature of our present invention resides in the provision of a receptacle for roll film, particularly a cartridge for use in still cameras. In its elementary form, the receptacle comprises a housing defining a film-receiving chamber and having an elongated mouth provided with a light trap through which the film may be moved lengthwise into or from the chamber, and rolling means provided in the chamber for convoluting the film as the film moves through the mouth and into the chamber. The rolling means comprises at least one looped spring having a plurality of mutually inclined sections which allow the spring the expand in response to increasing diameter of convoluted film in the chamber whereby the thus expanded spring straddles the outermost convolution and prevents, or at least strongly opposes, unwinding of convoluted film. The spring may be a helical spring whose sections are constituted by helices. Alternatively, the spring may be of meandering shape preferably resembling a wave whose sections closely hug the periphery of convoluted film in the chamber. Such undulate or meandering spring may be obtained by deforming an originally straight elastic rod- or strip-shaped body.

In accordance with another feature of our invention, the receptacle may further comprise a looped shielding strip of flexible material which is received in the chamber and is surrounded by the spring. The shielding strip surrounds the outermost convolution of film in the chamber and one of its edge portions is secured to the housing at one side of the mouth.

The novel features which are considered as characteristic of the invention are set forth in particular in the appended claims. The improved receptacle itself, however, both as to its construction and the mode of assembling and utilizing the same, together with additional features and advantages thereof, will be best understood upon perusal of the following detailed description of certain specific embodiments with reference to the accompanying drawings, in which:

FIG. 5 is an enlarged transverse section through a third receptacle wherein the rolling means comprises a single spring of meandering shape; and FIG. 6 is a fragmentary section substantially as seen in the direction of arrows from the line VI—VI of FIG. 5.

Figure 1:
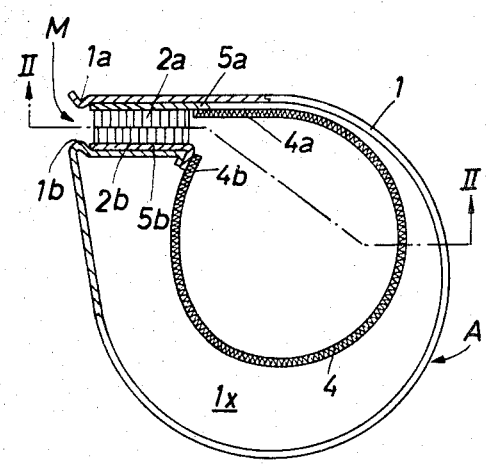
FIG. 1 is an enlarged transverse section through a receptacle for roll film which embodies one form of our invention and wherein the rolling means comprises two helical springs.
Figure 2:
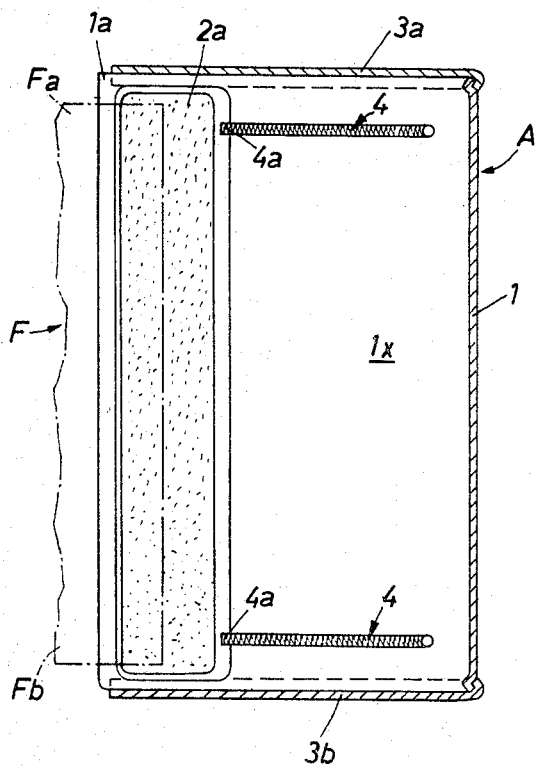
FIG. 2 is a section substantially as seen in the direction of arrows from the line II—II of FIG. 1.

Referring first to FIGS. 1 and 2, there is shown a receptacle in the form of film cartridge for use in still cameras. The receptacle comprises a housing A including a tubular mantle 1 whose axial ends are sealed by two disk-shaped end walls 3a, 3b defining therewith a substantially cylindrical film-receiving chamber 1x. The mantle 1 is formed with two axially parallel lips 1a, 1b which define a film mouth M accommodating a light trap which includes two elongated sealing strips 2a, 2b. These sealing strips respectively comprise elongated carriers 5a, 5b which may but need not be rigidly secured (for example, welded, glued or otherwise bonded) to the adjoining portions of the housing A. Alternatively, the carriers 5a, 5b may be riveted or otherwise mechanically fastened to the mantle 1.

The rolling means for film F which is fed lengthwise through the mouth M and between the sealing elements 2a, 2b comprises two looped helical springs 4 which are adjacent to the end walls 3a, 3b and whose end portions 4a, 4b are secured to the housing A at the opposite sides of the mouth M. For example, the end convolutions of the springs 4 may be flattened out and may be placed between the carriers 5a, 5b and the respective portions of the mantle 1 so as to be permanently secured to the housing A at the time the housing is connected with the carriers 5a, 5b. It will be noted that the springs 4 are adjacent to the longitudinal ends of the mouth M so that each thereof can engage the respective marginal portion Fa, Fb of the roll film, namely, one of the two perforated marginal portions. The perforations of the film F are not shown in FIG. 2. This insures that the helices of the springs 4 are less likely to scratch or otherwise damage the emulsion on the exposed surface of the outermost convolution, particularly when the diameter of convoluted film in the chamber 1x increases.

A very important advantage of springs 4 is that each of their portions can subject the adjoining part of the outermost film convolution to the same bias. Thus, a helical spring tends to straighten itself out and, when deformed to resemble a loop, each of its portions exhibits the same tendency to reassume ts original shape. Also, a helical spring can readily expand whereby its bias increases proportionally with increasing diameter of the roll film. This insures that the convolutions of roll film remain tightly packed (i.e., that they are close to each other) and also that the rolled-up film forms a true cylinder without the formation of waves or other unevennesses which are observable after prolonged storage of roll film whose convolutions are not truly cylindrical. As explained hereinbefore, any waves, pleats or other permanent unevennesses in roll film can prevent such film from lying flat against the film gate during exposure so that the quality of pictures is affected by improper positioning of a film frame behind the objective.

The carriers 5a, 5b of the sealing elements 2a, 2b may be removably inserted into the mouth M and the end portions 4a, 4b of the springs 4 may be welded or riveted only to such carriers so that the springs and the sealing elements may form a unit which can be inserted into or withdrawn from the housing A.

It will be readily understood that the receptacle of FIGS. 1 and 2 may comprise a single helical spring 4 or three or more helical springs. A single spring is preferably installed midway between the ends of the mouth M. If the receptacle comprises three or more springs, the springs are preferably equidistant from each other and one such spring is preferably adjacent to each end wall of the housing as actually shown in FIG. 2.

Another very important advantage of helical springs is that such springs automatically assume a substantially circular or looped shape when their end portions move close to each other. This also contributes to the formation of a truly cylindrical film roll in the chamber 1x. Such loop formation is due to the aforediscussed feature of helical springs that each of their portions exhibits the same resistance to flexing. When the film F is introduced between the sealing elements 2a, 2b and its marginal portions Fa, Fb slide along the inner sides of the looped springs 4, the film is automatically caused to form convolutions which are rolled into each other whereby the springs retain their substantially circular shape and thus assist the convolutions of coiled-up film to form a cylinder of truly or at least nearly cylindrical shape.

Figure 3:
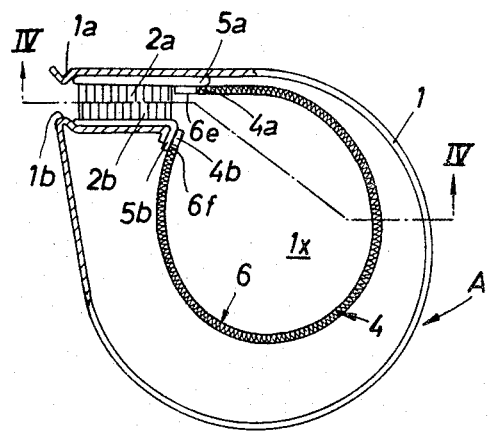
FIG. 3 is an enlarged transverse section through a modified receptacle which comprises two helical springs and a flexible shielding strip serving to prevent direct contact between the outermost convolution of film and the springs.
Figure 4:
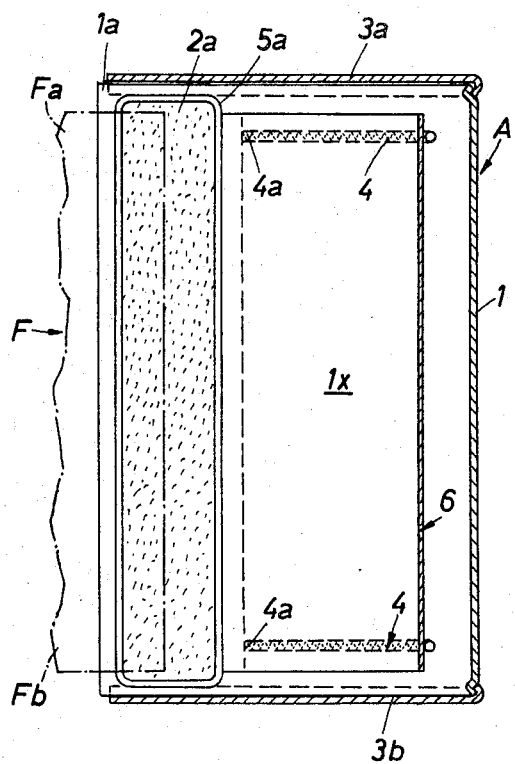
FIG. 4 is a section substantially as seen in the direction of arrows from the line IV—IV of FIG. 3.

FIGS. 3 and 4 illustrate a receptacle which is identical with the receptacle of FIGS. 1 and 2 but further comprises a shielding strip 6 of flexible metallic, plastic or other suitable material. The purpose of the strip 6 is to form a loop within the looped helical springs 4 and to thus prevent direct contact between the helices of springs 4 and the exposed surface of the outermost film convolution. The provision of the shielding strip 6 is of particular advantage when the rolling means comprises a single spring 4 or three or more springs because at least one spring is then invariably located between the two perforated marginal portions Fa, Fb of convoluted film F and is more likely to scratch the light-sensitive emulsion.

As shown in FIG. 3, one elongated edge portion 6e of the looped strip 6 is attached to the carrier 5a of the sealing element 2a. The other straight edge portion 6f of the strip 6 is free so that this strip can readily follow the outline of the outermost film convolution when the diameter of convoluted film in the chamber 1x increases.

Referring finally to FIGS. 5 and 6 there is shown a third receptacle which comprises a housing B composed of a tubular mantle 1 and end walls 3a, 3b which define with the mantle a substantially cylindrical chamber 1x. This receptacle comprises a single spring 8 of meandering shape which is disposed substantially midway between the ends of the mouth M. The end portions or terminals of the spring 8 (which actually resembles a wave) resemble hair pins each having a straight end 8a and a bent-over end 8b. The housing B is formed with two pairs of recesses or notches 1d, 1e which respectively receive the ends 8b, 8a, see FIG. 6. The recesses 1d are formed in the inner side of the end wall 3a adjacent to one longitudinal end of the mouth M and the recesses 1e are formed in the inner side of the end wall 3b at the other longitudinal end of the mouth. It will be noted that the recesses 1d and 1e are respectively located at the opposite sides of the mouth M.

The receptacle of FIGS. 5 and 6 comprises a somewhat modified shielding strip 6 which is provided with weight-reducing and material-saving perforations 6c. Furthermore, the strip 6 of FIGS. 5 and 6 is provided with two looped marginal portions 6a which may be constituted by beads and serve to maintain the major part of the strip 6 out of actual contact with the exposed surface of the outermost film convolution. The beaded marginal portions 6a will slide along the perforated marginal portions of the film, i.e., along such portions which are not exposed when the user of a camera takes a picture. The strip 6 is preferably made of synthetic thermoplastic material and, when made of such material, the provision of relatively large perforations 6c therein results in substantial savings in material. The housing A and/or B as well as the spring 8 and/or springs 4 may be made of plastic material. Of course, it is equally possible to utilize metallic springs.

The mutually inclined sections of the spring 8 shown in FIGS. 5 and 6 closely hug the exposed surface of the outermost film convolution. In other words, the sections of the spring 8 are preferably located on the periphery of a cylinder. The spring 8 may be obtained by deforming an originally straight bar or strip of elastomeric metallic or plastic material. It is further clear that, though FIGS. 5 and 6 show that the spring 8 comprises two substantially hairpin-shaped terminals which are removably anchored in the housing B, this spring may be provided with straight end portions or terminals which can be bonded or riveted to the carriers 5a, 5b of the sealing elements 2a, 2b or directly to the mantle 1 of the housing B. However, the configuration of FIGS. 5 and 6 is normally preferred because the hairpin-shaped terminals do not affect the elasticity of the spring 8.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. A receptacle for roll film, comprising a housing defining a film-receiving chamber and having a mouth through which the film may be moved lengthwise into or from said chamber; and rolling means provided in said chamber for convoluting the film as the film moves through said mouth and into said chamber, said rolling means comprising at least one substantially circular wire spring located in said chamber and secured at one end to one side of said mouth substantially adjacent thereto and on the other end to the other side of said mouth also substantially adjacent thereto, said substantially circular wire spring composed of closely adjacent wire loops adapted to expand and contract without substantially any lateral movement thereby permitting said wire spring to expand in response to increase of the diameter of convoluted film enveloped by said spring, the expanding wire spring due to the wire loops thereof being adapted to follow closely the outline of the major part of the outermost convolutions of the film so as to firmly guide the same.

2. A receptacle as set forth in claim 1, wherein said wire spring is a helical wire spring and said loops are constituted by the helices of said wire spring.

3. A receptacle as set forth in claim 1, wherein said wire spring is of meandering loop shape.

4. A receptacle as set forth in claim 3, wherein said wire spring consists of an originally straight elastic body which is deformed to assume an undulate shape.

5. A receptacle as set forth in claim 3, wherein the spring resembles a body of undulate shape and its sections hug the periphery of convoluted film in said chamber.

6. A receptacle as set forth in claim 1, further comprising a shielding strip of flexible material received in said chamber and surrounded by said spring, said strip surrounding the outermost convolution of film in said chamber and having an edge portion secured to said housing at one side of said mouth.

7. A receptacle as set forth in claim 6, wherein said strip comprises arcuate marginal portions which engage the marginal portions of the outermost film convolutions to hold the major part of said strip from direct contact with the outer side of such outermost convolution.

8. A receptacle as set forth in claim 7, wherein said marginal portions comprise beads.

9. A receptacle as set forth in claim 6, wherein said strip is perforated.

10. A receptacle as set forth in claim 1, wherein said spring is of meandering shape and includes two hairpin-shaped terminals adjacent to the opposite sides of said mouth and anchored in said housing.

11. A receptacle as set forth in claim 1, further comprising a pair of elongated sealing elements received in and forming a light trap for said mouth, each of said sealing elements comprising a carrier secured to said housing and said spring comprising two end portions each fixed to one of said carriers.

References Cited

UNITED STATES PATENTS 2,709,050   5/1955   Mansberg ---------- 242—71.1

FOREIGN PATENTS 231,198   10/1960   Australia.
876,817   8/1942   France.
629,025   4/1936   Germany.
622,646   5/1949   Great Britain.

GEORGE F. MAUTZ, *Primary Examiner.*